(12) United States Patent　　(10) Patent No.:　　US 8,002,335 B2
　　　Usuda　　　　　　　　　　　　　　(45) Date of Patent:　　Aug. 23, 2011

(54) VEHICLE COWL STRUCTURE

(75) Inventor: Yoshitaka Usuda, Shizuoka (JP)

(73) Assignee: Suzuki Motor Corporation, Hamamatsu-shi (JP)

( * ) Notice: Subject to any disclaimer, the term of this patent is extended or adjusted under 35 U.S.C. 154(b) by 107 days.

(21) Appl. No.: 12/423,047

(22) Filed: Apr. 14, 2009

(65) Prior Publication Data

US 2009/0261621 A1　　Oct. 22, 2009

(30) Foreign Application Priority Data

Apr. 18, 2008　　(JP) ................ P2008-108520

(51) Int. Cl.
　　　*B62D 25/08*　　(2006.01)
(52) U.S. Cl. ............. 296/192; 296/187.04; 296/203.02; 296/208
(58) Field of Classification Search ............... 296/192, 296/193.02, 203.02, 201, 208, 96.21, 187.04, 296/187.09
See application file for complete search history.

(56) References Cited

U.S. PATENT DOCUMENTS

| | | | | |
|---|---|---|---|---|
| 3,843,194 A * | 10/1974 | Yamada | ................ | 296/192 |
| 4,988,144 A * | 1/1991 | Johnson et al. | ............... | 296/192 |
| 5,533,779 A * | 7/1996 | Epple et al. | ................ | 296/192 |
| 5,561,882 A * | 10/1996 | Eustache et al. | ......... | 15/250.001 |
| 5,692,953 A * | 12/1997 | Bell et al. | .................... | 454/146 |
| 6,193,305 B1 * | 2/2001 | Takahashi | ................ | 296/192 |
| 6,213,541 B1 * | 4/2001 | Razgunas et al. | ............ | 296/192 |
| 6,428,074 B1 * | 8/2002 | Sukegawa et al. | ............ | 296/29 |
| 6,682,131 B2 * | 1/2004 | Hayashi | ................ | 296/192 |
| 6,921,126 B2 * | 7/2005 | Suh et al. | ................ | 296/192 |
| 7,000,979 B2 * | 2/2006 | Borkowski et al. | ............ | 296/192 |
| 7,004,534 B2 * | 2/2006 | Yoshii et al. | ................ | 296/192 |
| 7,066,533 B2 * | 6/2006 | Sohmshetty et al. | ..... | 296/203.02 |
| 7,093,890 B2 * | 8/2006 | Vaniterson | ................ | 296/192 |
| 7,182,397 B1 * | 2/2007 | Desai | ................ | 296/192 |
| 7,219,953 B2 * | 5/2007 | Mori | ................ | 296/192 |
| 7,316,448 B2 * | 1/2008 | Koyama et al. | ................ | 296/192 |
| 7,357,212 B2 * | 4/2008 | Sasaki et al. | ................ | 180/274 |
| 7,357,446 B2 * | 4/2008 | Sakai et al. | ................ | 296/192 |
| 7,552,964 B2 * | 6/2009 | Saito | ................ | 296/192 |
| 2005/0067859 A1 * | 3/2005 | Yoshii et al. | ................ | 296/192 |
| 2006/0087155 A1 * | 4/2006 | Koyama et al. | ................ | 296/192 |
| 2006/0202516 A1 * | 9/2006 | Mori | ................ | 296/192 |
| 2009/0058139 A1 * | 3/2009 | Izawa | ................ | 296/192 |
| 2009/0261621 A1 * | 10/2009 | Usuda | ................ | 296/192 |
| 2010/0187862 A1 * | 7/2010 | Kurata et al. | ................ | 296/192 |

FOREIGN PATENT DOCUMENTS

| | | |
|---|---|---|
| JP | 4-328076 | 11/1992 |
| JP | 3362995 B2 | 10/2002 |
| JP | 2004-284415 | 10/2004 |

OTHER PUBLICATIONS

English Abstract of JP 8310447.
Chinese Office Action dated Apr. 27, 2010, issued in corresponding Chinese Patent Application No. 200910135173.3.

* cited by examiner

*Primary Examiner* — Glenn Dayoan
*Assistant Examiner* — Gregory Blankenship
(74) *Attorney, Agent, or Firm* — Stein McEwen, LLP

(57) ABSTRACT

A vehicle cowl structure is provided. A cowl part is disposed between a lower end of a front glass of a vehicle and a rear end of a front hood. The cowl part has a two-layer structure which has a metallic cowl panel having a design surface and a resinous cowl cover disposed below the metallic cowl panel.

4 Claims, 8 Drawing Sheets

VEHICLE COWL STRUCTURE

This application claims priority from Japanese Patent Application No. 2008-108520 filed Apr. 18, 2008, the entire contents of which are herein incorporated by reference.

BACKGROUND

The present invention relates to a vehicle cowl structure, more particularly, to a cowl part disposed between a lower end of a front glass of a vehicle and a rear end of a front hood.

A cowl part is disposed between a lower end of a front glass of a vehicle and a rear end of a front hood, and the cowl part is required to have an air introducing function or a pedestrian protecting function. In recent years, a panel part is made of a resin for the purpose of decreasing the weight, improving the fuel efficiency, or improving the durability.

For example, according to a front structure of a vehicle body disclosed in Patent Document 1, since a cowl part is made of a synthetic resin, the cost can be remarkably reduced and the weight can be approximately halved relative to that of a metal-sheet cowl part. In addition, in Patent Document In order to achieve the above-described object, according to an aspect of at least one embodiment of the present invention, there is provided a vehicle cowl structure comprising: a cowl part disposed between a lower end of a front glass of a vehicle and a rear end of a front hood, wherein the cowl part has a two-layer structure which has a metallic cowl panel having a design surface and a resinous cowl cover disposed below the metallic cowl panel.

Patent Document 1: Japanese Patent No. 3362995

In a vehicle required to have a retro exterior, the cowl part made of a black resin may be poor in matching with the exterior appearance of the vehicle and deteriorate an exterior quality. In addition, when the cowl part is made of a resin having the same color as that of the vehicle body, a manufacture cost increases due to a cost of a painting process or a problem of a heat expansion arises.

On the other hand, when the cowl part is completely made of a metallic material, it deteriorates a pedestrian protecting performance or moldability of an air inlet.

SUMMARY

It is therefore an object of at least one embodiment of the present invention is to provide a vehicle cowl structure capable of allowing a vehicle to have a retro exterior without deteriorating an air introducing performance or a pedestrian protecting performance.

In order to achieve the above-described object, according to an aspect of at least one embodiment of the present invention, there is provided a vehicle cowl structure comprising: a cowl part disposed between a lower end of a front glass of a vehicle and a rear end of a front hood, wherein the cowl part has a two-layer structure which has a metallic cowl panel having a design surface and a resinous cowl cover disposed below the metallic cowl panel.

With the above configuration, since the resinous cowl cover has excellent moldability and shock absorbing performance, it is possible to improve the air introducing performance or the passenger protecting performance. In addition, since the metallic cowl panel constitutes the design surface of the cowl part so as to obtain the same material feeling as that of the old styled vehicle, it is possible to obtain the vehicle having a retro exterior. In addition, by painting the metallic cowl panel with the same color as that of the vehicle body, a painting process of the metallic cowl panel can be carried out at the same time as when a painting process of the vehicle body is carried out. Accordingly, a painting cost is remarkably reduced and a color of the metallic cowl panel completely matches with that of the vehicle body, and it is possible to obtain a vehicle having an excellent exterior.

The resinous cowl cover may be formed with an opening, the metallic cowl panel may be formed with a notch, and a resinous garnish formed with an opening may be provided in the notch.

With the above configuration, it is possible to introduce a sufficient amount of outside air into the inside of the vehicle through the opening of the garnish and the opening of the resinous garnish without significantly deteriorating the exterior quality of the vehicle.

The opening may be formed in one half side of the resinous cowl cover in a width direction of the vehicle and the opening is not formed in another half side of the resinous cowl cover, and a wiper module may be covered by the another half side of the resinous cowl cover.

With the above configuration, while ensuring a required amount of air by using the opening (air inlet) which is formed in the one half side of the resinous cowl cover in the width direction of the vehicle, the another half side covers the wiper module to prevent it from being damaged by water. In addition, since the resinous cowl cover is disposed below the metallic cowl panel having the design surface, it is possible to relatively freely form the opening (air inlet) in the resinous cowl cover without having an influence on the design surface.

The metallic cowl panel may be provided with a fixing portion which fixes the metallic cowl panel to the resinous cowl cover.

With the above configuration, the resinous cowl cover is broken so as to absorb a shock when a pedestrian's head collides with the cowl part. Accordingly, it is possible to efficiently protect the pedestrian by reducing the shock strength.

The resinous cowl cover is disposed between the metallic cowl panel and a fender bracket supporting a fender panel with respect to a vehicle body.

With the above configuration, since the resinous cowl cover is disposed between the fender bracket and the metallic cowl panel, the collision energy applied to the metallic cowl panel is promptly transmitted to the fender bracket via the resinous cowl cover, and a timing at which the fender bracket starts deforming to absorb the collision energy becomes faster. As a result, it is possible to more efficiently protect the pedestrian from the shock by promptly reducing the shock strength.

BRIEF DESCRIPTION OF THE DRAWINGS

The above and other aspects of the present invention will become more apparent by describing in detail exemplary embodiments thereof with reference to the accompanying drawings, wherein.

DETAILED DESCRIPTION OF EXEMPLARY EMBODIMENTS

Figure 1:
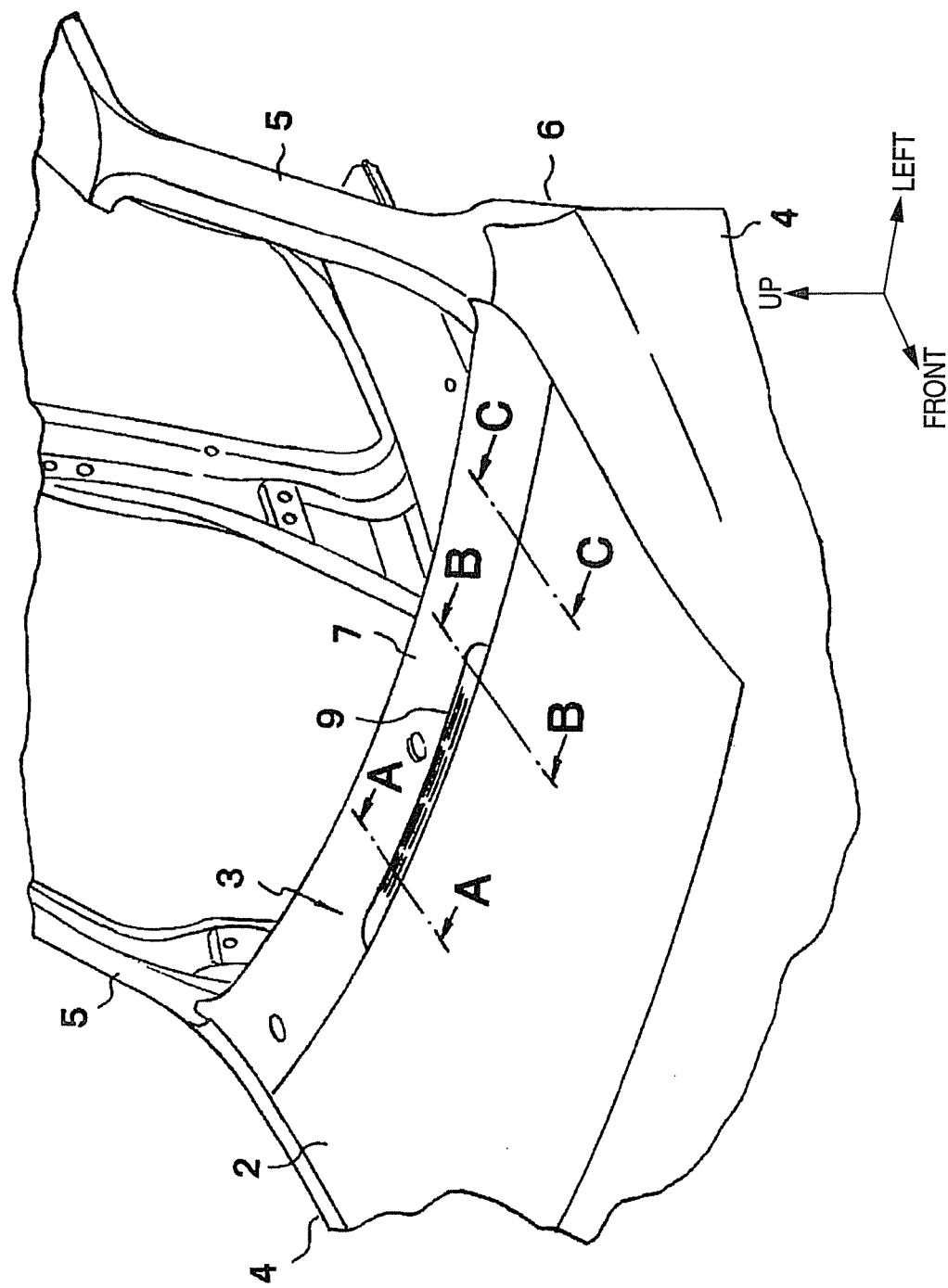
FIG. 1 is a partial perspective view illustrating an assembled state of a vehicle cowl structure according to an embodiment of the present invention.

Hereinafter, an exemplary embodiment of the invention will be described with reference to the accompanying drawings.

As shown in FIGS. 1 to 4, a cowl part 3 is extended in a width direction of a vehicle between a lower end of a front glass 1 which is disposed at a front part of the vehicle and a rear end of a front hood 2 which is disposed at the front side of the front glass 1. A pair of left and right metallic fender panels 4 are disposed adjacent to both left and right ends of the cowl part 3. A pair of left and right side bodies 6 and a pair of left and right front pillars 5 are disposed at the rear side of cowl part 3 along the boundary line between the fender panel 4 and the cowl part 3.

Figure 2:
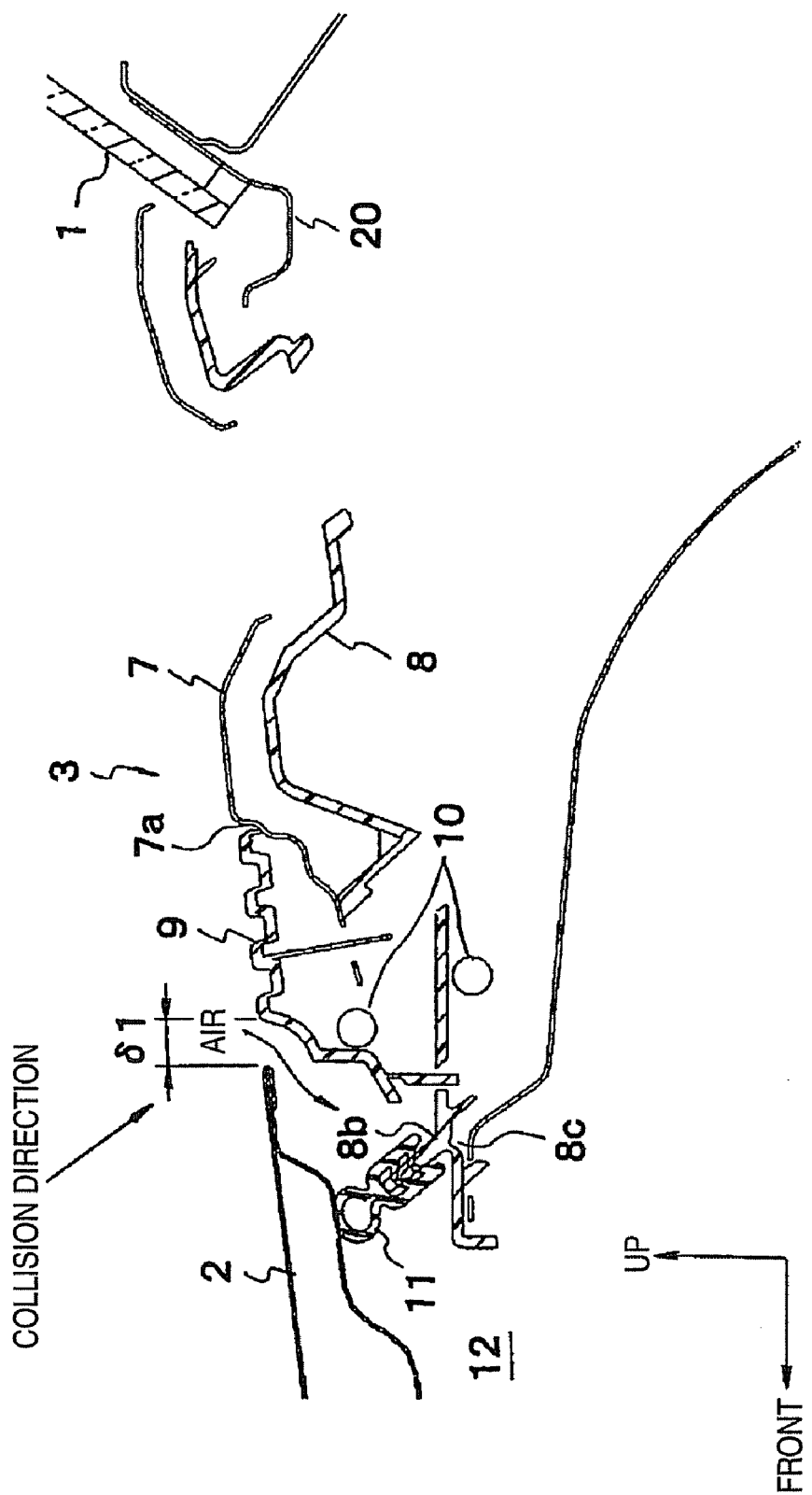
FIG. 2 is an enlarged sectional view taken along the line A-A in FIG. 1.
Figure 3:
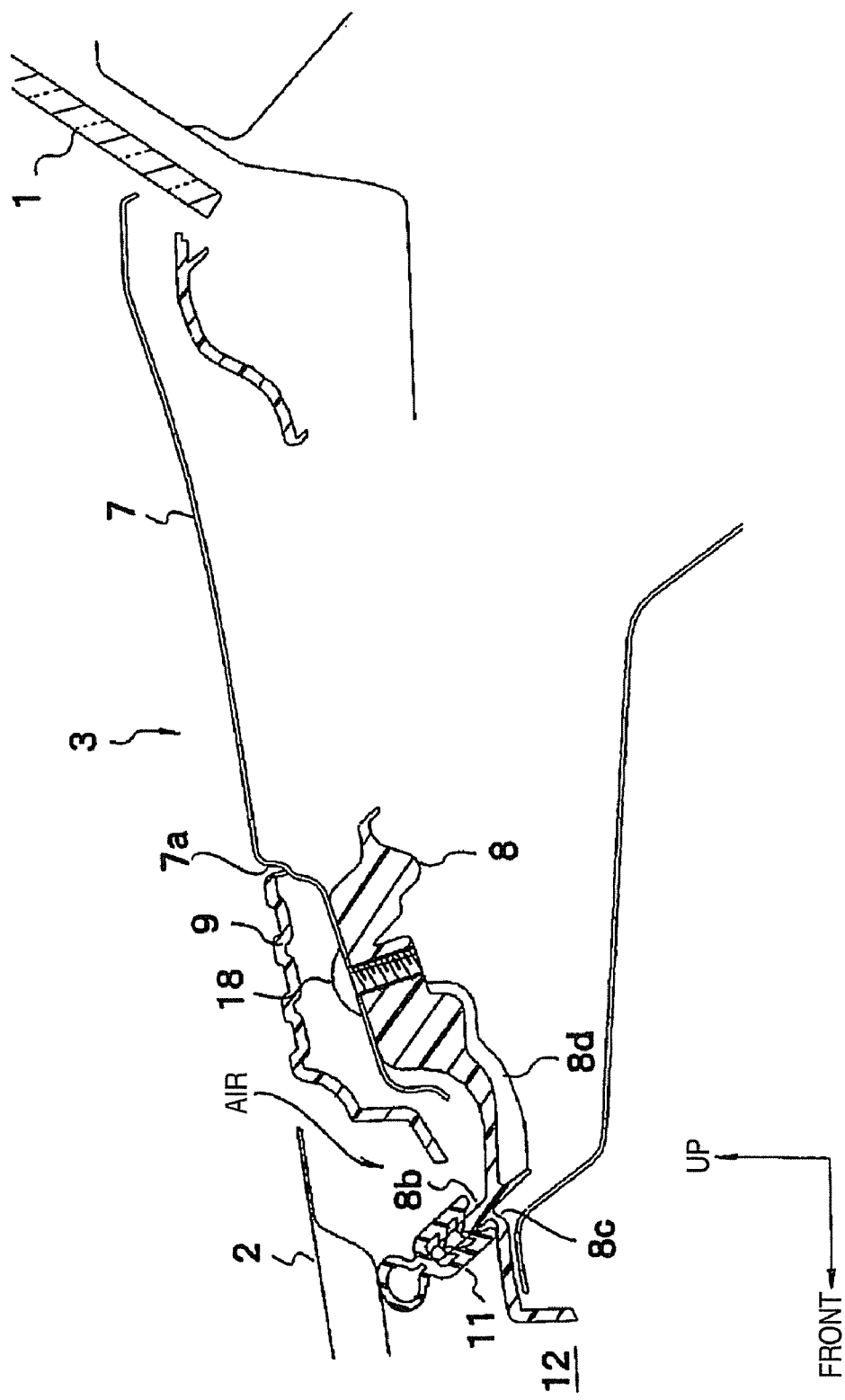
FIG. 3 is an enlarged sectional view taken along the line B-B in FIG. 1.
Figure 4:
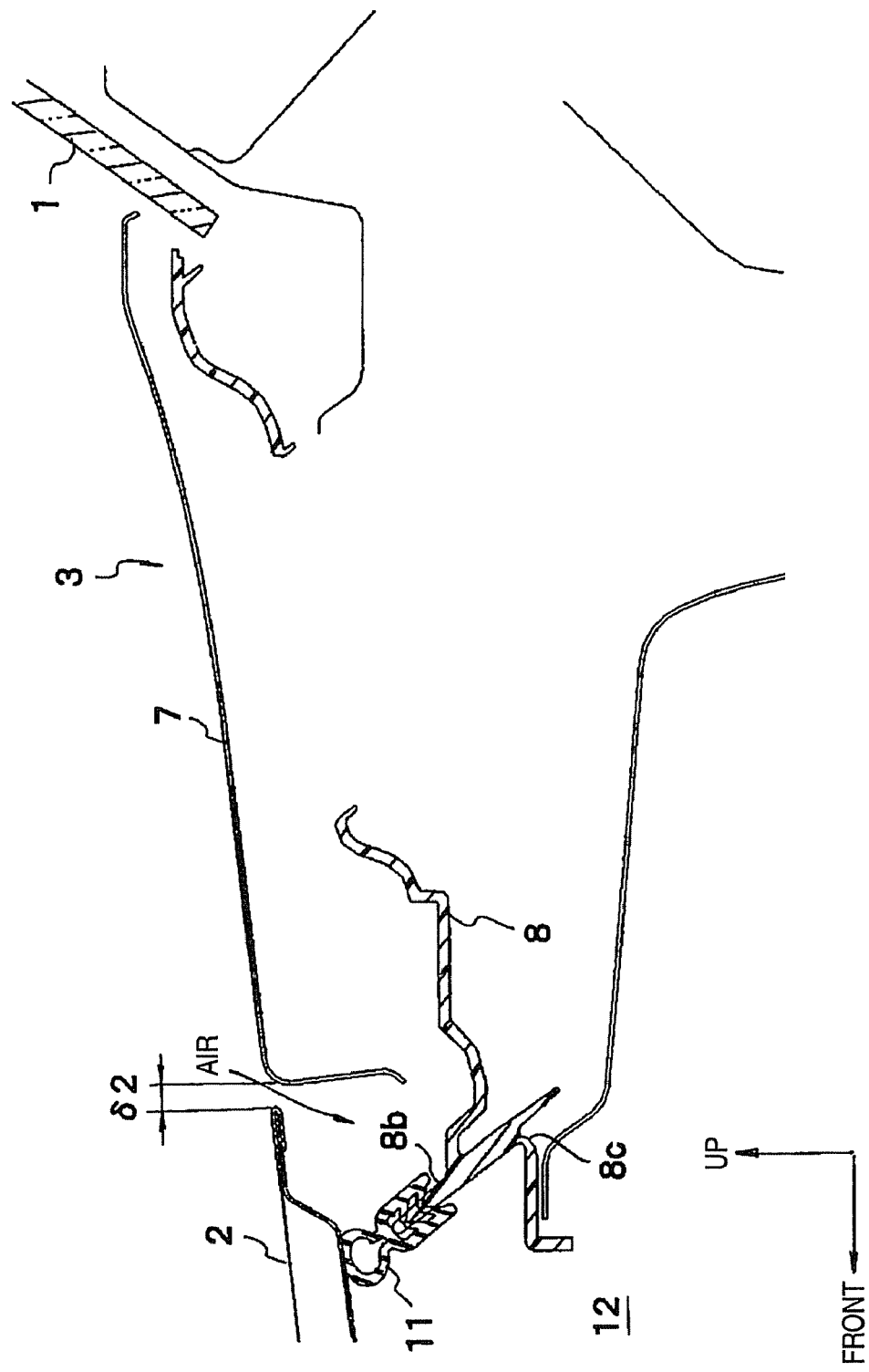
FIG. 4 is an enlarged sectional view taken along the line C-C in FIG. 1.

As shown in FIGS. 2 to 4, the cowl part 3 has a two-layer structure in which a resinous cowl cover 8 is disposed below a metallic cowl panel 7 which has a design surface continued to the front hood 2. The "design surface" means a visible surface exposed to the outside of the vehicle. The design surface constitutes the exterior appearance of the vehicle. Here, the metallic cowl panel 7 is made of metal having the same material feeling as that of the front hood 2. The metallic cowl panel 7 is obtained by press-forming a steel sheet and is painted with the same color as that of the vehicle body.

Figure 5:
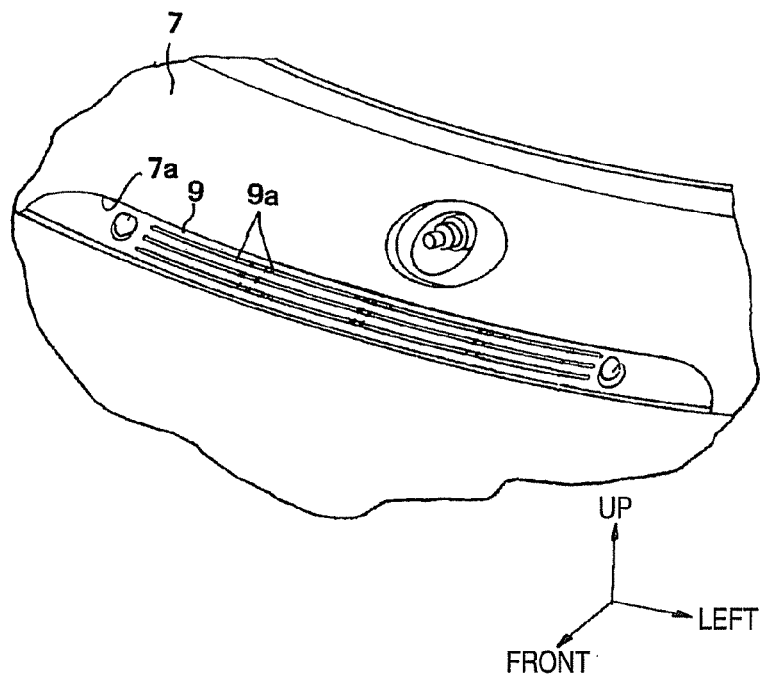
FIG. 5 is a partial perspective view illustrating a resinous garnish of a cowl part according to the embodiment.
Figure 10:
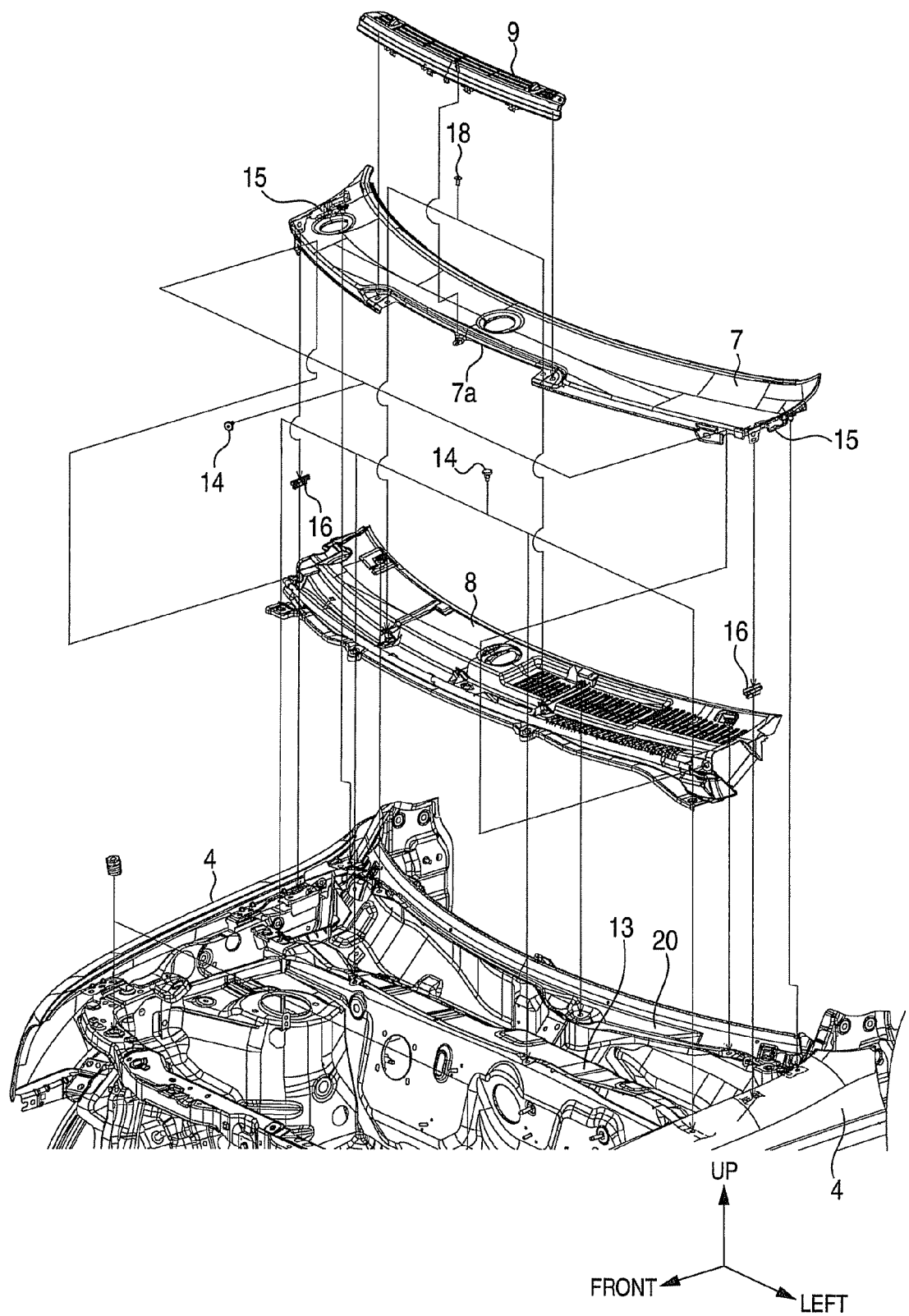
FIG. 10 is an exploded perspective view illustrating an assembled structure of the vehicle cowl structure according to the embodiment.

As shown in FIG. 10, a notch 7a which is extended in the width direction of the vehicle is formed at the center of a front edge of the metallic cowl panel 7 in the width direction of the vehicle. A resinous garnish 9 is mounted in the notch 7a. The resinous garnish 9 is integrally formed of a resin. As shown in FIG. 5, the resinous garnish 9 is formed with a plurality of slit-like air inlets 9a which are extended in the width direction of the vehicle. As shown in FIGS. 2 and 3, a gap $\delta 1$ is formed between the resinous garnish 9 and the front hood 2. As shown in FIG. 4, the gap $\delta 1$ is set to be larger than a gap $\delta 2$ formed between the metallic cowl panel 7 (a portion where the resinous garnish 9 is not provided) and the front hood 2 ($\delta 1 > \delta 2$).

Figure 6:
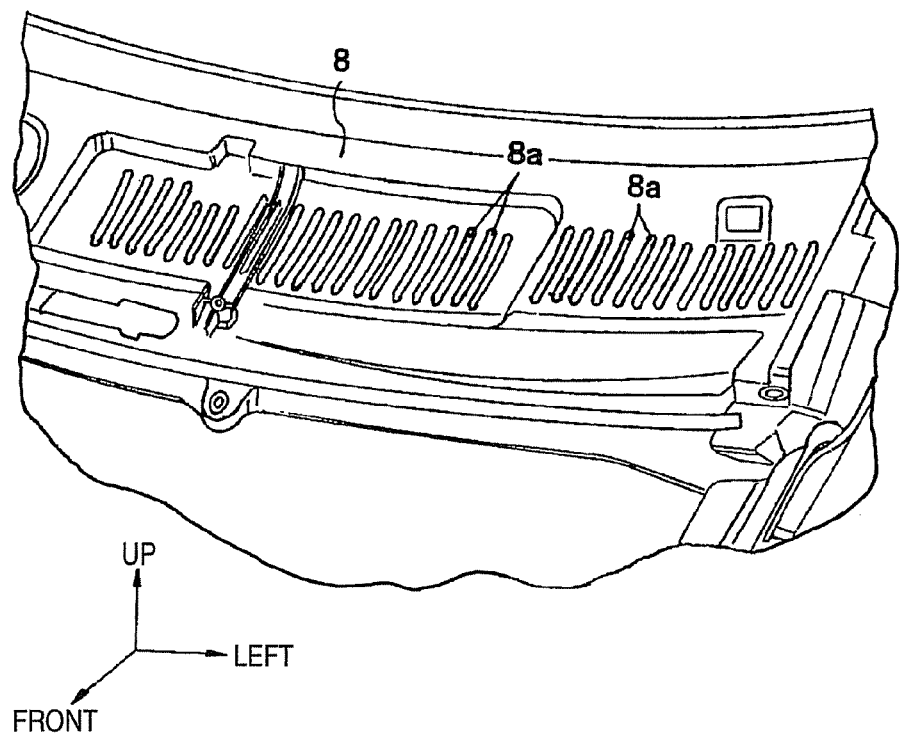
FIG. 6 is a partial perspective view illustrating a left half of a resinous cowl cover in a width direction of a vehicle according to the embodiment.
Figure 7:
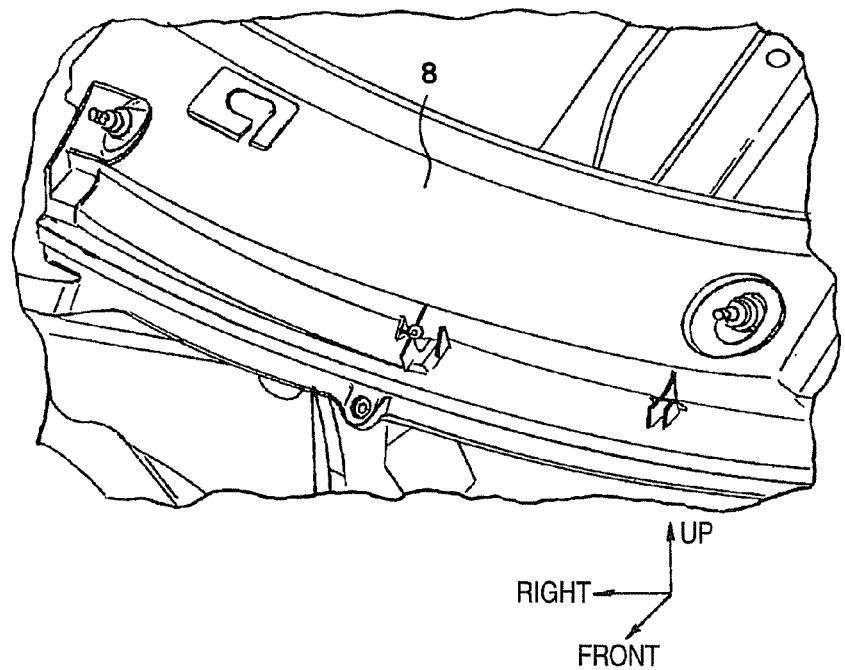
FIG. 7 is a partial perspective view illustrating a right half of the resinous cowl cover in the width direction of the vehicle according to the embodiment.

The resinous cowl cover 8 is integrally formed of a resin. A length of the resinous cowl cover 8 in its longitudinal direction (in the width direction of the vehicle) is set to be slightly shorter than that of the metallic cowl panel 7, and a length (width dimension) of the resinous cowl cover 8 in its width direction (in a longitudinal direction of the vehicle) is set to be slightly longer (wider) than that of the metallic cowl panel 7. As shown in FIG. 6, one half side (left half) of the resinous cowl cover 8 in the width direction of the vehicle is formed with a plurality of slit-like air inlets 8a which are extended in the longitudinal direction of the vehicle. On the contrary, as shown in FIG. 7, another half side (right half) of the resinous cowl cover in the width direction of the vehicle is not formed with the air inlets so as to cover a wiper module (which is not shown). As shown in FIG. 2, a washer 10 used to supply a cleaning liquid to a washer nozzle is extended in the width direction of the vehicle.

As shown in FIGS. 2 to 4, a rib-shaped protrusion 8b is formed on the front end of the resinous cowl cover 8 throughout the width thereof so as to protrude in an obliquely upward direction. The protrusion 8b is attached with a seal member 11 which is made of an elastic material such as rubber. The seal member 11 comes into contact with a rear surface of the rear end of the front hood 2 so as to seal an engine room 12. Here, the base end of the protrusion 8b of the resinous cowl cover 8 is provided with a fragile portion 8c of which a thickness is partially thin relative to the other portion of the resinous cowl cover 8. This fragile portion 8c serves as a starting point when the resinous cowl cover 8 starts to be broken. As shown in FIG. 3, the resinous cowl cover 8 is provided with a reinforcing rib 8d.

Next, the assembled structure of the metallic cowl panel 7, the resinous cowl cover 8, and the resinous garnish 9 which constitute the cowl part 3 will be described with reference to FIG. 10.

First, a plurality of positions (in this embodiment, four positions) of the resinous cowl cover 8 are attached to a cowl front panel 13 disposed at a vehicle side by clips 14. Subsequently, the clips (in this embodiment, three clips) attached to the resinous cowl cover 8 are attached to a cowl top panel 20 disposed at the vehicle side, the metallic cowl panel 7 is attached thereon, and then the resinous garnish 9 is attached to the metallic cowl panel 7.

Figure 8:
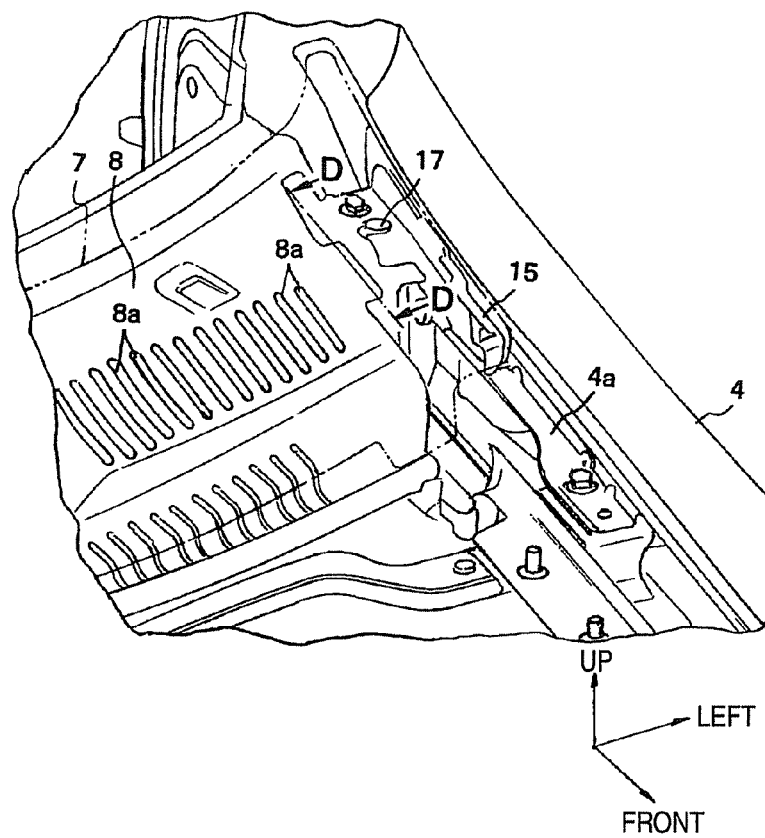
FIG. 8 is a partial perspective view illustrating an attachment structure of a left end of the cowl part to a vehicle body according to the embodiment.

Here, a separate cowl brackets 15 are respectively fixed to lower surfaces of both left and right ends of the metallic cowl panel 7. Four positions (in total) of both left and right ends of the metallic cowl panel 7 are attached to a flange surface 4a which is lower by one level than the fender panel 4 shown in FIG. 8 and is disposed on the inside of the fender panel 4 by means of two types of clips 16 and 17 (see FIGS. 8 and 10). The other two positions thereof are attached to the resinous cowl cover 8 by means of the clips 14. Further, the other two positions thereof are attached to the resinous cowl cover 8 by fastening a screw 18 (see FIG. 3). Here, only the attachment structure of one end (left end) of the metallic cowl panel 7 in the width direction of the vehicle is shown in FIG. 8. The description of the attachment structure of the other end (right end) will be omitted because the attachment structure of the right end is the same as that of the left end.

Finally, attaching two positions of the resinous garnish 9 to the metallic cowl panel 7 by means of a clip (not shown) mounted to the resinous garnish 9, the assembling operation of the cowl part 3 is completed.

Figure 9:
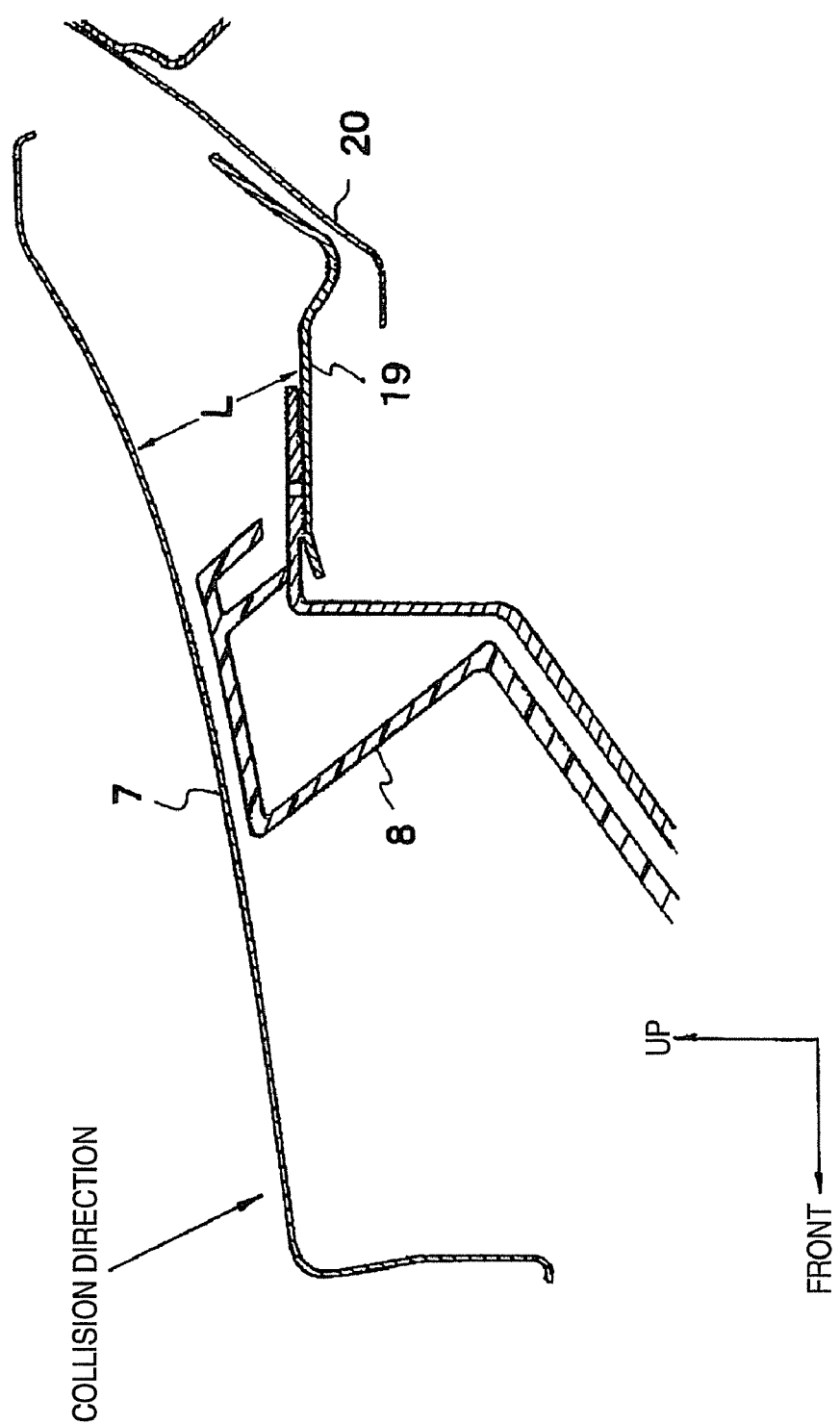
FIG. 9 is an enlarged sectional view taken along the line D-D in FIG. 8.

As shown in FIG. 9, the resinous cowl cover 8 is disposed between the metallic cowl panel 7 and a fender bracket 19 which supports the fender panel 4 to the vehicle body. A part of the resinous cowl cover 8 is placed on the fender bracket 19. The fender bracket 19 is formed into a shape which is deformed upon colliding with a pedestrian's head so as to absorb the collision energy.

As described above, in this embodiment, since the metallic cowl panel 7 constitutes the design surface of the cowl part 3, most of the design surface from the front part to the side part of the vehicle except for the front glass 1 is formed by the painted metallic panel. Accordingly, the same material feeling can be obtained as that of the vehicle manufactured at the time when a resin molding technology is not particularly advanced. Accordingly, it is possible to obtain a vehicle having a retro exterior.

In addition, since the metallic cowl panel 7 is painted with the same color as that of the vehicle body, a painting process of the metallic cowl panel 7 can be carried out at the same time as when a painting process of the vehicle body is carried out. Accordingly, a painting cost is remarkably reduced, a color of the metallic cowl panel 7 completely matches with that of the vehicle body, and it is possible to obtain a vehicle having an excellent exterior.

Since the cowl part 3 has the two-layer structure in which the resinous cowl cover 8 is disposed below the metallic cowl panel 7, the air inlets 8a can be easily formed on the resinous cowl cover 8 which has excellent moldability. Therefore, a sufficient amount of the outside air can be introduced into the inside of the vehicle through the air inlets 8a, thereby improving an air introducing performance. Since the air inlets 9a are formed in the resinous garnish 9 which is provided in the metallic cowl panel 7 having the design surface, a sufficient amount of the outside air can be introduced into the inside of the vehicle through the air inlets 9a, the air inlets 8a formed on the resinous cowl cover 8, the gap δ1 (see FIGS. 2 and 3) formed between the resinous garnish 9 and the front hood 2, and the gap δ2 (see FIG. 4) formed between the metallic cowl panel 7 and the front hood 2. Further, the exterior quality of the vehicle does not deteriorate because the resinous garnish 9 is provided.

As shown in FIG. 6, one half side (left half) of the resinous cowl cover 8 in the width direction of the vehicle is provided with the air inlets 8a and another half side (right half) of the resinous cowl cover 8 is not provided with the air inlets. The another half side covers the wiper module (not shown). Accordingly, it is possible to prevent the wiper module from being damaged by water while ensuring a required amount of air through the air inlets 8a. Since the resinous cowl cover 8 is disposed below the metallic cowl panel 7 having the design surface, it is possible to relatively freely form the air inlets 8a in the resinous cowl cover 8 without having an influence on the design surface.

The metallic cowl panel 7 is provided with a fixing portion for fixing the metallic cowl panel 7 to the resinous cowl cover 8, and a part of the metallic cowl panel 7 can be attached to the resinous cowl cover 8. Accordingly, when a pedestrian collides with the cowl part 3 to apply a shock to the cowl part 3 in a direction indicated by the arrow shown in FIGS. 2 and 9, the shock is transmitted to the resinous cowl cover 8 so that the resinous cowl cover 8 is elastically deformed or the resinous cowl cover 8 is broken from the fragile portion 8c shown in FIGS. 2 to 4, thereby absorbing the collision energy. As a result, it is possible to efficiently protect the pedestrian by reducing the shock strength.

As shown in FIG. 9, the resinous cowl cover 8 is disposed between the fender bracket 19 and the metallic cowl panel 7. If the resinous cowl cover 8 does not exist between the fender bracket 19 and the metallic cowl panel 7, since a distance L between the fender bracket 19 and the metallic cowl panel 7 become relatively long, it takes a long time until the collision energy is transmitted from the metallic cowl panel 7 to the fender bracket 19 to be absorbed. As a result, it is not difficult to efficiently reduce the shock strength.

On the other hand, in this embodiment, since the resinous cowl cover 8 is disposed between the fender bracket 19 and the metallic cowl panel 7, the collision energy applied to the metallic cowl panel 7 is promptly transmitted to the fender bracket 19 via the resinous cowl cover 8, and a timing at which the fender bracket 19 is deformed to start to absorb the collision energy becomes faster. As a result, it is possible to more efficiently protect the pedestrian from the shock by promptly reducing the shock strength.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A vehicle cowl structure comprising:
a cowl part disposed between a lower end of a front glass of a vehicle and a rear end of a front hood,
wherein the cowl part has a two-layer structure which has a metallic cowl panel having a design surface and a resinous cowl cover disposed below the metallic cowl panel,
wherein the resinous cowl cover is formed with an opening, wherein the metallic cowl panel is formed with a notch, and wherein a resinous garnish formed with an opening is provided in the notch.

2. The vehicle cowl structure as set forth in claim 1, wherein the opening of the resinous cowl cover is formed in one half side of the resinous cowl cover in a width direction of the vehicle and the opening of the resinous cowl cover is not formed in another half side of the resinous cowl cover in the width direction of the vehicle, and
wherein a wiper module is covered by the another half side of the resinous cowl cover.

3. The vehicle cowl structure as set forth in claim 1, wherein the metallic cowl panel is provided with a fixing portion which fixes the metallic cowl panel to the resinous cowl cover.

4. The vehicle cowl structure as set forth in claim 1, wherein the resinous cowl cover is disposed between the metallic cowl panel and a fender bracket supporting a fender panel with respect to a vehicle body.

* * * * *